(Model.)
G. H. WARREN.
Wrench.
No. 230,595.          Patented July 27, 1880.
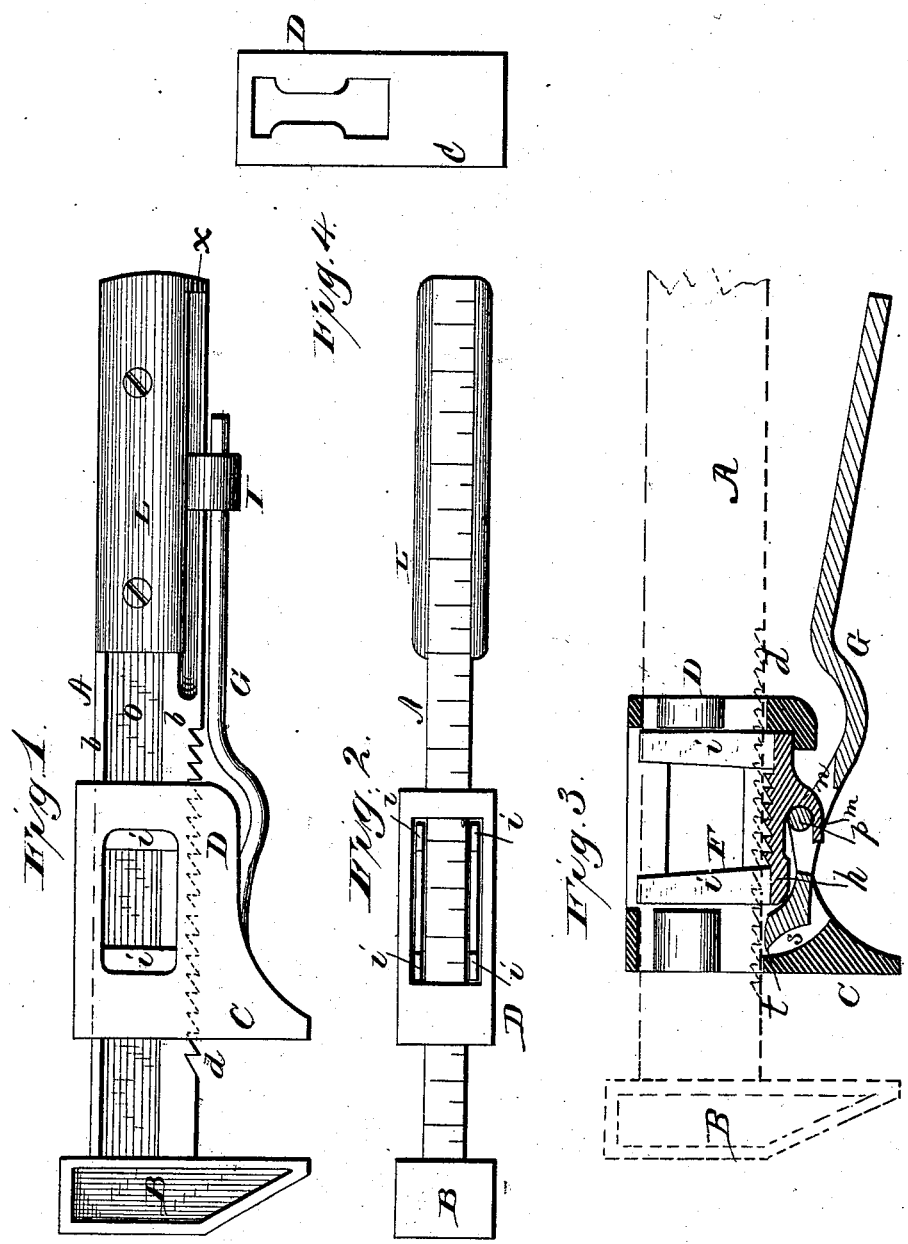
Witnesses
Franck L. Ourand
J. J. McCarthy
Inventor:
George H. Warren
By Alexander Mason
Atty

UNITED STATES PATENT OFFICE.

GEORGE H. WARREN, OF TAMA CITY, IOWA.

WRENCH.

SPECIFICATION forming part of Letters Patent No. 230,595, dated July 27, 1880.

Application filed March 25, 1880. (Model.)

*To all whom it may concern:*

Be it known that I, GEORGE H. WARREN, of Tama City, in the county of Franklin, and in the State of Iowa, have invented certain new and useful Improvements in Wrenches; and I do hereby declare that the following is a full, clear, and exact description thereof, reference being had to the accompanying drawings, and to the letters of reference marked thereon, making a part of this specification.

The nature of my invention consists in the construction and arrangement of a monkey-wrench, as will be hereinafter more fully set forth.

In order to enable others skilled in the art to which my invention appertains to make and use the same, I will now proceed to describe its construction and operation, referring to the annexed drawings, in which—

Figure 1 is a side view of my wrench. Fig. 2 is an edge view thereof. Fig. 3 is a section of movable jaw, slide, and operating-lever. Fig. 4 is an end view of the movable jaw.

A represents the handle, provided with the fixed jaw B. The handle A is formed on each side with a groove, o, leaving flanges or ribs b b, extending the entire length of the handle.

On the inner side of the handle are formed teeth d, for adjusting and holding the movable jaw C. This movable jaw is formed in one piece with a skeleton-frame, D, having openings in its ends of such form as to correspond with the cross-section of the handle, so that it can be slipped onto the handle from the end thereof.

Within the frame D is placed a skeleton-slide, F, composed of a toothed bar, h, with side arms, i, the toothed bar engaging with the teeth on the handle. The slide F is formed with a hook, m, as shown in Fig. 3.

G represents the operating-lever, made substantially of the form shown, and provided with a slot, n, in which is a pin, p, to enter the hook m of the slide, while the point t of the lever enters in a recess, s, in the movable jaw.

By throwing out the lever G the slide F is disengaged from the teeth d, and the jaw C can then be moved to or from the fixed jaw B, as required; and by closing the lever toward the handle the slide is made to engage again with said teeth, and thus hold the movable jaw firmly in position. The lever G is then locked by means of a small slide, I, slipped over the ribs b, as shown.

When the different pieces have been placed in position on the handle, scale-pieces L L are fastened on opposite sides thereof at the end and fastened by screws. These scale-pieces are at their outer ends formed with projections x, which act as stops to prevent the slide I from coming off, while the entire scale-pieces prevent the movable jaw, &c., from getting off the handle. One edge of the handle is graduated, as shown.

Having thus fully described my invention, what I claim as new, and desire to secure by Letters Patent, is—

1. The combination, with the handle A and fixed jaw B, of the movable jaw C, with skeleton-frame D, interior slide, F, and lever G, all constructed substantially as and for the purposes herein set forth.

2. The combination of the grooved and ribbed handle A, the scale-pieces L, formed with the projections x, movable jaw C, with frame D, slide F, and lever G, all substantially as and for the purposes herein set forth.

In testimony that I claim the foregoing I have hereunto set my hand this 19th day of February, 1880.

GEO. H. WARREN.

Witnesses:
G. G. CLEMMER,
A. W. BEED.